United States Patent
Williams

(10) Patent No.: US 10,800,310 B2
(45) Date of Patent: Oct. 13, 2020

(54) TRAILER TIPPER FEATURING MULTI-USE TILT SENSORS FOR AUTOMATING LEVELING AND TIPPING OPERATIONS

(71) Applicant: Columbia Trailer Co. Inc., Hillsboro, OR (US)

(72) Inventor: Karl Williams, Beaverton, OR (US)

(73) Assignee: Columbia Trailer Co. Inc., Hillsboro, OR (US)

( * ) Notice: Subject to any disclaimer, the term of this patent is extended or adjusted under 35 U.S.C. 154(b) by 282 days.

(21) Appl. No.: 16/013,805

(22) Filed: Jun. 20, 2018

(65) Prior Publication Data

US 2018/0370408 A1 Dec. 27, 2018

Related U.S. Application Data

(60) Provisional application No. 62/523,087, filed on Jun. 21, 2017.

(51) Int. Cl.
*B60P 1/16* (2006.01)
*B60P 1/28* (2006.01)
*B60P 1/04* (2006.01)

(52) U.S. Cl.
CPC .............. *B60P 1/162* (2013.01); *B60P 1/045* (2013.01); *B60P 1/28* (2013.01); *B60P 1/283* (2013.01)

(58) Field of Classification Search
CPC .. B60P 1/162; B60P 1/045; B60P 1/28; B60P 1/283
See application file for complete search history.

(56) References Cited

U.S. PATENT DOCUMENTS

| | | | |
|---|---|---|---|
| 5,971,493 A * | 10/1999 | Robert | B60P 1/045 280/6.154 |
| 6,050,573 A | 4/2000 | Kunz | |
| 6,402,451 B1 | 6/2002 | Brown | |
| 6,579,054 B2 | 6/2003 | Smith | |
| 6,860,695 B2 | 3/2005 | Chapman et al. | |
| RE39,477 E * | 1/2007 | Nellers | B60G 9/02 280/124.112 |
| 2006/0088385 A1 | 4/2006 | Ford et al. | |
| 2007/0065260 A1 * | 3/2007 | Chapman | B60P 1/28 414/354 |

(Continued)

FOREIGN PATENT DOCUMENTS

DE 102013202415 A1 8/2014

OTHER PUBLICATIONS

Wadsworth et al., "Level-headed," Cranes & Access, vol. 6, No. 1, Jan. 2004, 1 page.

(Continued)

*Primary Examiner* — Sze-Hon Kong
(74) *Attorney, Agent, or Firm* — Alleman Hall Creasman & Tuttle LLP

(57) ABSTRACT

A trailer tipper features multi-use tilt sensors for automating leveling and tipping operations. In an example, a computerized method for controlling operation of a trailer tipper is disclosed. The trailer tipper includes a frame at least partially supported relative to a ground surface by a set of outriggers. The trailer tipper further includes a tipping platform that is rotatable relative to the frame about a hinge axis. The computerized method includes a plurality of operations that may be used to at least partially automate leveling and tipping operations.

20 Claims, 3 Drawing Sheets

(56) References Cited

U.S. PATENT DOCUMENTS

| | | | |
|---|---|---|---|
| 2007/0246902 A1 | 10/2007 | Trudeau et al. | |
| 2009/0272952 A1* | 11/2009 | Manuel Alguera | B60S 9/08 |
| | | | 254/424 |
| 2014/0246101 A1* | 9/2014 | Trumper | G01B 7/30 |
| | | | 137/355.24 |
| 2016/0257236 A1* | 9/2016 | Baldys | B60P 1/045 |
| 2016/0353185 A1 | 12/2016 | Krishnan et al. | |
| 2017/0021751 A1* | 1/2017 | Baldys | B60P 1/162 |
| 2018/0056841 A1* | 3/2018 | Baldys | B60P 1/162 |
| 2018/0111537 A1* | 4/2018 | Baldys | B60P 1/283 |
| 2018/0276902 A1* | 9/2018 | Baldys | B60P 1/283 |
| 2018/0290581 A1* | 10/2018 | Derstine | B60P 1/34 |
| 2020/0055437 A1* | 2/2020 | Sollenlid | B60P 1/28 |

OTHER PUBLICATIONS

"Dual Axis Signal Processed Units for OEM," Mandeno Electronics (2015) Ltd., Available at http://mandeno.co.nz, Retrieved Aug. 28, 2018, 2 pages.

Hitchcox, "Inclination Sensor Keeps Things on the Level," Hydraulics and Pneumatics, Available Online at https://www.hydraulicspneumatics.com, Feb. 18, 2014, 3 pages.

* cited by examiner

OBTAINING FIRST SET OF SENSOR SIGNALS FROM FIRST TILT SENSOR ARRAY MOUNTED AT FIRST LOCATION ON TIPPING PLATFORM 510

↓

DETERMINING FIRST DIFFERENCE BETWEEN INITIAL ORIENTATION AT FIRST LOCATION RELATIVE TO REFERENCE PLANE AT INITIAL ORIENTATION OF TIPPING PLATFORM 512

↓

CONTROLLING ELECTRO-HYDRAULIC ACTUATORS TO VARY HEIGHT OF OUTRIGGERS TO REDUCE FIRST DIFFERENCE TO WITHIN FIRST THRESHOLD 514

↓

OBTAINING SECOND SET OF SENSOR SIGNALS FROM SECOND TILT SENSOR ARRAY MOUNTED AT SECOND LOCATION ON FRAME 516

↓

DETERMINING SECOND DIFFERENCE BETWEEN INITIAL ORIENTATION AT SECOND LOCATION ON FRAME 518

↓

CONTROLLING ELECTRO-HYDRAULIC ACTUATORS TO VARY HEIGHT OF OUTRIGGERS TO REDUCE SECOND DIFFERENCE TO WITHIN SECOND THRESHOLD 520

↓

OBTAINING THIRD SET OF SENSOR SIGNALS FROM THIRD TILT SENSOR ARRAY MOUNTED AT THIRD LOCATION ON FRAME 522

↓

DETERMINING THIRD DIFFERENCE BETWEEN INITIAL ORIENTATION AT THIRD LOCATION ON FRAME 524

↓

CONTROLLING ELECTRO-HYDRAULIC ACTUATORS TO VARY HEIGHT OF OUTRIGGERS TO REDUCE THIRD DIFFERENCE TO WITHIN THIRD THRESHOLD 526

↓

WHILE WITHIN FIRST THRESHOLD (AND SECOND, THIRD THRESHOLDS), ENABLING TIPPING OPERATION 528

↓

DURING TIPPING OPERATION, OBTAINING SUBSEQUENT SET OF SENSOR SIGNALS FROM FIRST TILT SENSOR ARRAY 530

↓

LIMITING MAXIMUM TIPPING ANGLE OF TIPPING PLATFORM DURING TIPPING OPERATION BASED ON SUBSEQUENT ORIENTATION INDICATED BY SUBSEQUENT SET OF SENSOR SIGNALS 532

↓

PROCESSING, STORING, PRESENTING, REPORTING MEASUREMENT DATA AND/OR PROCESSED FORMS THEREOF 534

TRAILER TIPPER FEATURING MULTI-USE TILT SENSORS FOR AUTOMATING LEVELING AND TIPPING OPERATIONS

CROSS REFERENCE TO RELATED APPLICATIONS

This U.S. non-provisional patent application claims priority to U.S. provisional patent application Ser. No. 62/523,087, filed Jun. 21, 2017, and titled "TRAILER TIPPER FEATURING MULTI-USE TILT SENSORS FOR AUTOMATING LEVELING AND TIPPING OPERATIONS", the entirety of which is incorporated herein by reference for all purposes.

BACKGROUND

Trailer tippers may be used in a variety of contexts to assist in the dumping of contents from a trailer. In a typical configuration, trailer tippers include a tipping platform rotationally mounted to a frame by a hinge. The frame may be supported relative to the ground surface by multiple outriggers having hydraulically actuated legs. The tipping platform may be loaded with a trailer, and then rotated relative to the frame by another set of hydraulic actuators to perform a tipping operation.

SUMMARY

A trailer tipper features multi-use tilt sensors for automating leveling and tipping operations. In an example, a computerized method for controlling operation of a trailer tipper is disclosed. The trailer tipper includes a frame at least partially supported relative to a ground surface by a set of outriggers. The trailer tipper further includes a tipping platform that is rotatable relative to the frame about a hinge axis. The computerized method includes a plurality of operations that may be used to at least partially automate leveling and/or tipping operations.

For example, the method may include obtaining a first set of sensor signals from a first tilt sensor array mounted at a first location on a tipping platform of the trailer tipper. The method may further include determining a first difference between an initial orientation at the first location indicated by the first set of sensor signals about two orthogonal rotational axes relative to a reference plane at an initial rotational position of the tipping platform. The hinge axis may have a vector component within at least one of the two orthogonal rotational axes. The method may further include controlling one or more electro-hydraulic actuators to vary a height of one or more outriggers to reduce the first difference between the initial orientation at the first location relative to the reference plane to within a first threshold.

While within the first threshold, the method may further include enabling a tipping operation in which the tipping platform is rotated relative to the frame by one or more hydraulically variable tipping arms. During the tipping operation, the method may further include obtaining a subsequent set of sensor signals from the first tilt sensor array. The method may further include limiting a maximum tipping angle of the tipping platform about the hinge axis relative to the frame during the tipping operation based on a subsequent orientation indicated by the subsequent set of sensor signals from the first tilt sensor array.

The trailer tipper may further include a second tilt sensor array mounted at a second location on the frame of the trailer tipper. In at least some implementations, the first location of the first tilt sensor array may be nearer to the hinge than the second location of the second tilt sensor array. The second tilt sensor array may provide increased resolution for automated leveling in relation to the first tilt sensor array, thereby accounting for frame torsion or deflection that may be present under loading conditions.

With regards to the second tilt sensor array, the method may further include obtaining a second set of sensor signals from the second tilt sensor array. The method may further include determining a second difference between an initial orientation of the frame at the second location of the second tilt sensor array indicated by the second set of sensor signals about two orthogonal rotational axes relative to a reference plane. The method may further include controlling one or more electro-hydraulic actuators of the set of outriggers to vary a height of one or more of the set of outriggers to reduce the difference between the initial orientation of the frame at the second location relative to the reference plane to within a second threshold. In at least some implementations, the tipping operation may be enabled only while operating within the first and second thresholds.

This summary provides non-limiting examples of the subject matter described in further detail with respect to the detailed description and associated drawings. Accordingly, this summary is to be considered non-limiting with respect to claimed subject matter.

BRIEF DESCRIPTION OF DRAWINGS

FIG. 5 is a flow diagram depicting an example method for controlling operation of a trailer tipper.

DETAILED DESCRIPTION

Trailer tippers may be used in a variety of contexts to assist in the dumping of contents from a trailer. In a typical configuration, trailer tippers include a tipping platform rotationally mounted to a frame by a hinge. The frame may be supported relative to the ground surface by multiple outriggers having hydraulically actuated legs. The tipping platform may be loaded with a trailer, and then rotated relative to the frame by another set of hydraulic actuators to perform a tipping operation.

Leveling of the frame is generally required before use of a trailer tipper. Within the context of a rearward-tipping platform, leveling of the frame may include setting the tipping platform to a pre-defined angle of inclination (i.e., ramp angle) of approximately 4-6 degrees (or other suitable angle) away from the dump site. The tipping platform may be set to the pre-defined angle by leveling the frame when the tipping platform is at an initial position (i.e., rest position) relative to the frame for loading a trailer onto the tipping platform. Leveling of the frame in right/left directions relative a longitudinal axis of the frame is also generally required before use of the tipper.

Traditionally, trailer tippers rely on manual leveling at their installation site, which can be time consuming and prone to operator error. For example, the operator may be required to individually adjust the height of the outriggers' legs through manual operation of the hydraulic actuators. Additionally, during a tipping operation, manual operation of the tipping platform may be performed by manipulation of the hydraulic actuators that control the angle of the tipping platform relative to the frame. Here, overextending the hydraulic actuators may occur without skilled operator oversight or without a limiter being incorporated with the tipper to preclude an operator from manually exceeding a maximum tipping angle.

The present disclosure may address these and other issues associated with trailer tippers. In accordance with an aspect of the present disclosure, a trailer tipper features multi-use tilt sensors for automating leveling and tipping operations. A computerized method is also disclosed for controlling operation of a trailer tipper that includes tilt sensors. The computerized method includes a plurality of operations that may be used to at least partially automate leveling and tipping operations as described in further detail herein.

Figure 1:
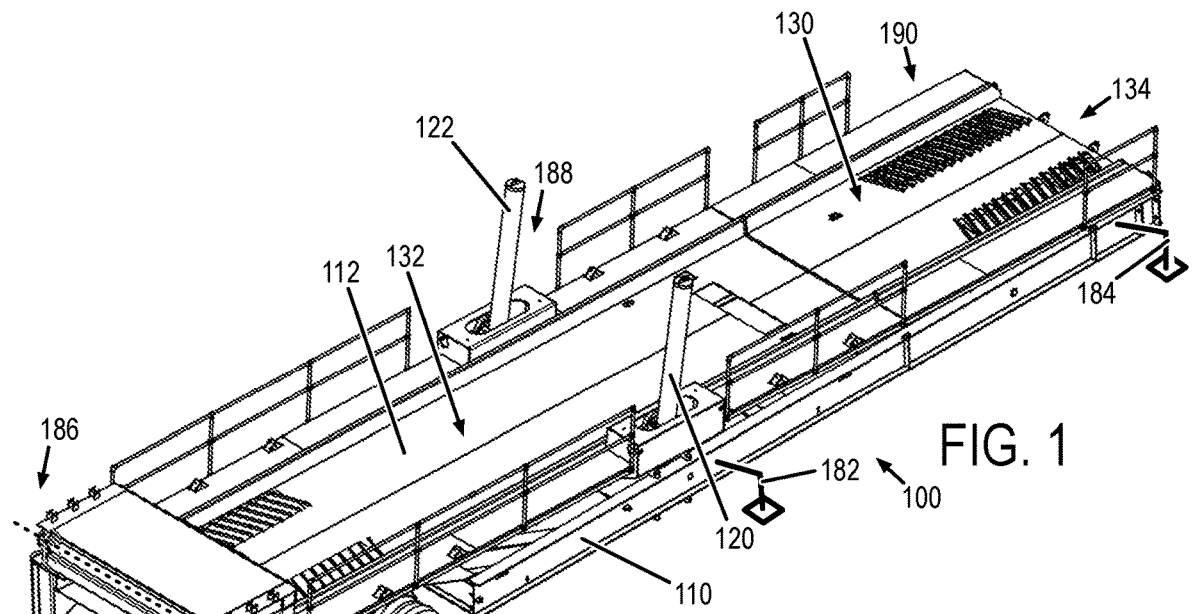
FIG. 1-3 depict an example trailer tipper.

FIG. 1 depicts an example trailer tipper 100. Tipper 100 may be used in a variety of contexts to assist in the dumping of contents from a trailer or other container. Tipper 100 includes a tipping platform 112 mounted to a frame 110 by at least hinge 114. Tipping platform 112 may be rotated relative to frame 110 about a hinge axis 116 of hinge 114. Tipping arms 120, 122 joining frame 110 to tipping platform 112 are hydraulically variable in length by one or more hydraulic actuators to rotate the tipping platform about hinge axis 116 to thereby perform a tipping operation.

When tipping platform 112 is at an initial position depicted in FIG. 1, a trailer may be backed onto loading deck 130 of frame 110, and then further backed onto tipping deck 132 of the tipping platform to thereby load the trailer onto the tipping deck of the tipping platform. A first end of tipper 100 may be referred to as a loading end 134 of the tipper, and a second end of tipper 100 may be referred to as the dumping end 136 of the tipper.

In at least some implementations, tipper 100 may take the form of a moveable trailer having a set of wheels 140 that enables the tipper to be towed between locations by a vehicle. Wheels 140 may be omitted or removable in at least some implementations.

Tipper 100 may further include one or more outriggers that may be used to fully or at least partially support frame 110 above the ground surface and/or to stabilize the frame relative to the ground surface. Each outrigger may include a leg that is hydraulically variable in length by an associated hydraulic actuator to thereby raise or lower the frame relative to the ground surface. Some or all of the hydraulic actuators of tipper 100 may be electro-hydraulic actuators as will be described in further detail with reference to FIG. 4. In the example depicted in FIG. 1, tipper 100 includes six outriggers, including three outriggers 180, 182, 184 located on a right side of the tipper, and three outriggers 186, 188, 190 located on a left side of the tipper. In this example, the outriggers are distributed along a length of frame 110 in which outriggers 180 and 186 are located near dumping end 136, outriggers 184, 190 are located near loading end 134, and outriggers 182, 188 are located near an intermediate location along the frame between the loading end and the dumping end of the tipper. A tipper may include a greater or lesser quantity of outriggers than depicted in FIG. 1, depending on implementation. For example, a tipper may include two, three, four, eight or more outriggers, each of which including hydraulically adjustable legs. Furthermore, outriggers may be located at different locations than depicted in FIG. 1, again depending on implementation.

Figure 2:
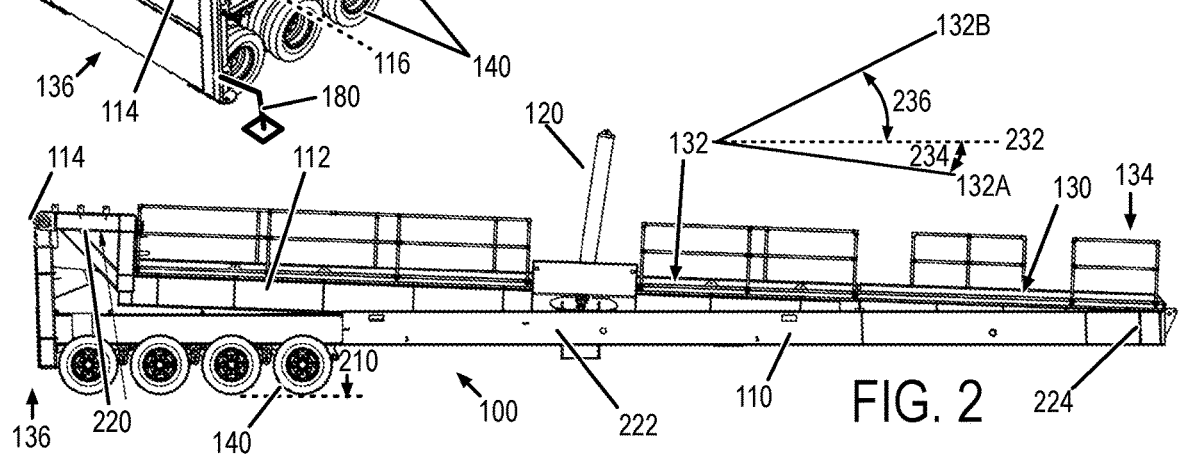

FIG. 2 depicts the example trailer tipper 100 of FIG. 1 in a side profile view within a vertical plane that is parallel to a longitudinal mid-plane of the tipper. An example angular range of tipping deck 132 of tipping platform 112 is depicted between an initial position 132A for loading/unloading of a trailer, and a tipping position 132B for dumping contents of a trailer. Within FIG. 2, a reference plane 232 of tipper 100 is depicted. In at least some implementations, reference plane 232 may correspond to a horizontal plane that is orthogonal to the gravitational vector. However, other suitable reference planes may be used. An example initial angle 234 of tipping deck 132 is depicted in FIG. 2, which corresponds to an initial position 132A of tipping deck 132. An example tipping angle 236 of tipping deck 132 is also depicted in FIG. 2, which corresponds to a tipping position 132B of tipping deck 132.

In this example, initial angle 234 corresponds to a negatively inclined angle of tipping deck 132 that is inclined towards loading end 134 of tipper 100. When tipping deck 132 is inclined at initial angle 234, tipping deck 132 may be substantially coplanar with loading deck 130. As a non-limiting example, the initial angle may correspond to a negative angle of approximately four to six degrees (−4-−6 degrees) relative to reference plane 232. When reference plane 232 is parallel to a horizontal plane, this negative angle may facilitate the loading/unloading of a trailer onto/from tipper 100. It will be understood that angle 234 may take other suitable values, depending on implementation. For example, reference plane 232 disclosed herein may instead be coplanar with tipping deck 132 at position 132A when tipping deck 132 is level about the longitudinal axis of the tipper. In this example, initial angle 234 may correspond to an angle of zero degrees.

Further in this example, tipping angle 236 corresponds to a positively inclined angle of tipping deck 132 that is inclined away from loading end 134 and towards dumping end 136 of tipper 100. As a non-limiting example, tipping angle may correspond to a positive angle of approximately 60 degrees (+60 degrees) relative to reference plane 232. It will be understood that angle 236 may take any suitable value, depending on implementation. An angular range of tipping deck 132 may be bounded by initial angle 234 and a maximum tipping angle, such as example tipping angle 236 or other suitable angle. In at least some implementations, reference plane 232 may be co-planar with and/or parallel to features of frame 110. For example, primary support beams of frame 110 may collectively form a plane that is co-planar with and/or parallel to reference plane 232.

Within FIG. 2, an example ground surface 210 is depicted in contact with the set of wheels 140. In at least some implementations, frame 100 including the set of wheels 140 may be raised relative to ground surface 210 by a set of outriggers (e.g., outriggers 180-190 of FIG. 1) when installed at a tipping location, during a loading/unloading operation, and/or during a tipping operation of tipper 100. In this configuration, wheels 140 may be fully raised off of the ground surface or at least partially unweighted. The set of outriggers may be used to stabilize the tipper and orientate reference plane 232 at a predetermined orientation relative to the horizontal plane. As a non-limiting example, the set of outriggers may be adjusted so that reference plane 232 is substantially parallel to or coplanar with the horizontal plane about two orthogonal rotational axes that define the reference plane.

Tipper 100 may include one or more tilt sensors to enable an orientation of reference plane 232 of tipper 100 to be determined relative to another datum. For example, a tilt sensor may provide a measure of an angle of inclination of reference plane 232 relative to a horizontal plane (as an example datum) about a single rotational axis or about multiple rotational axes that reside within the reference plane. As an example, a tilt sensor array, such as e.g., a multi-axis tilt sensor, may provide a measure of an angle of inclination of reference plane 232 relative to a datum (e.g., a horizontal plane) about two orthogonal rotational axes of the reference plane. During a leveling operation, a respective leg of one or more outriggers may be varied in length to adjust an orientation of frame 110, thereby adjusting an orientation of reference plane 232 relative to a datum. An example leveling operation will be described in further detail with reference to FIG. 5.

FIG. 2 further depicts non-limiting examples of tilt sensor locations on tipper 100. As a first example, a first tilt sensor or tilt sensor array may be included at a first location 220, which corresponds to a location that is on tipping platform 112 near hinge 114 and near dumping end 136 of the tipper. As a second example, a second tilt sensor or tilt sensor array may be included at a second location 222, which corresponds to a location that is on frame 110 at an intermediate region along a length of frame 110 between loading end 134 and dumping end 136, and near tipping arms 120, 122. As a third example, a third tilt sensor or tilt sensor array may be included at a third location 224, which corresponds to a location that is on frame 110 near loading end 134. However, it will be understood that these example locations are non-limiting examples, and that tilt sensors or tilt sensor arrays may be located at additional or alternative locations on tipper 100.

First location 220 on tipping platform 112 may provide both a measure of an orientation of tipping platform 112 relative to a datum plane and a measure of an orientation of tipping platform 112 relative to reference plane 232, at least within the plane depicted in FIG. 2. Given a known spatial relationship (e.g., initial angle 234) between reference plane 232 and tipping platform 112 at initial position 132A, a tilt sensor or tilt sensor array located on the tipping platform may serve as a multi-use tilt sensor for both leveling and tipping operations. Furthermore, tilt sensors or tilt sensor arrays located on frame 110, such as depicted at locations 222 and 224, for example, may provide increased resolution for manual or automated leveling in relation to the first tilt sensor array, thereby accounting for frame torsion or deflection that may be present under loading conditions.

Figure 3:
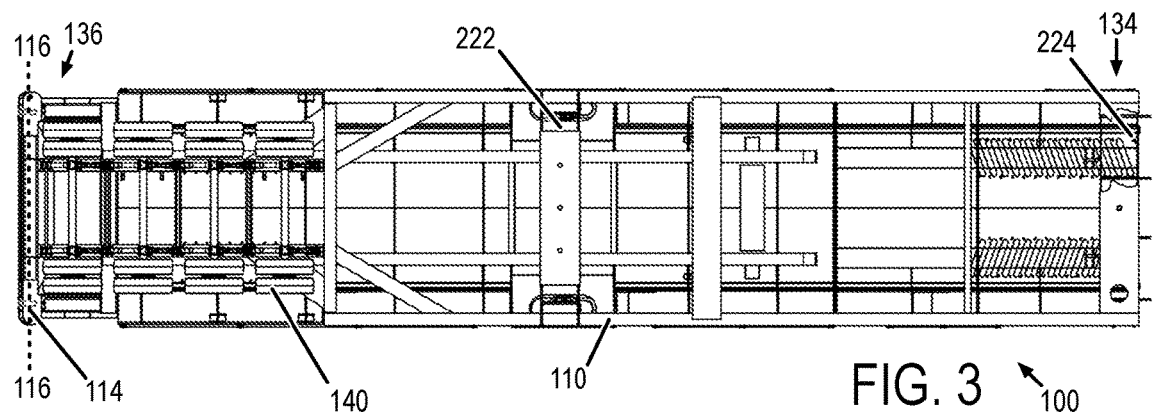

FIG. 3 depicts tipper 100 from an underside of frame 110. This view depicts an example of how tilt sensor locations 222 and 224 may be offset from the longitudinal mid-plane of the tipper in at least some implementations. This offset location towards an outer edge of the frame may serve to capture an orientation of frame components at or near an interface between the frame and a respective outrigger. Tilt sensor location 220, not visible in FIG. 3, may also be offset from the longitudinal mid-plane of the tipper. For example, some or all of tilt sensor locations 220, 222, and/or 224 may be located closer to an exterior side of the tipper than the longitudinal mid-plane. However, in other implementations, tilt sensor locations 220, 222, and/or 224 may reside on or near, and may not be offset relative to the longitudinal mid-plane of the tipper. In still further implementations, two or more of tilt sensor locations 220, 222, and/or 224 may be offset from the longitudinal mid-plane of the tipper on opposite sides of the longitudinal mid-plane. Furthermore, a trailer tipper may include greater or lesser quantities of tilt sensors or tilt sensor arrays distributed about the tipping platform and/or frame at suitable locations, depending on implementation. For example, two or more tilt sensor locations may be provided on both sides of the longitudinal mid-plane and/or along the longitudinal mid-plane at each of the locations depicted in FIG. 2 at 220, 222, and 224.

Figure 4:
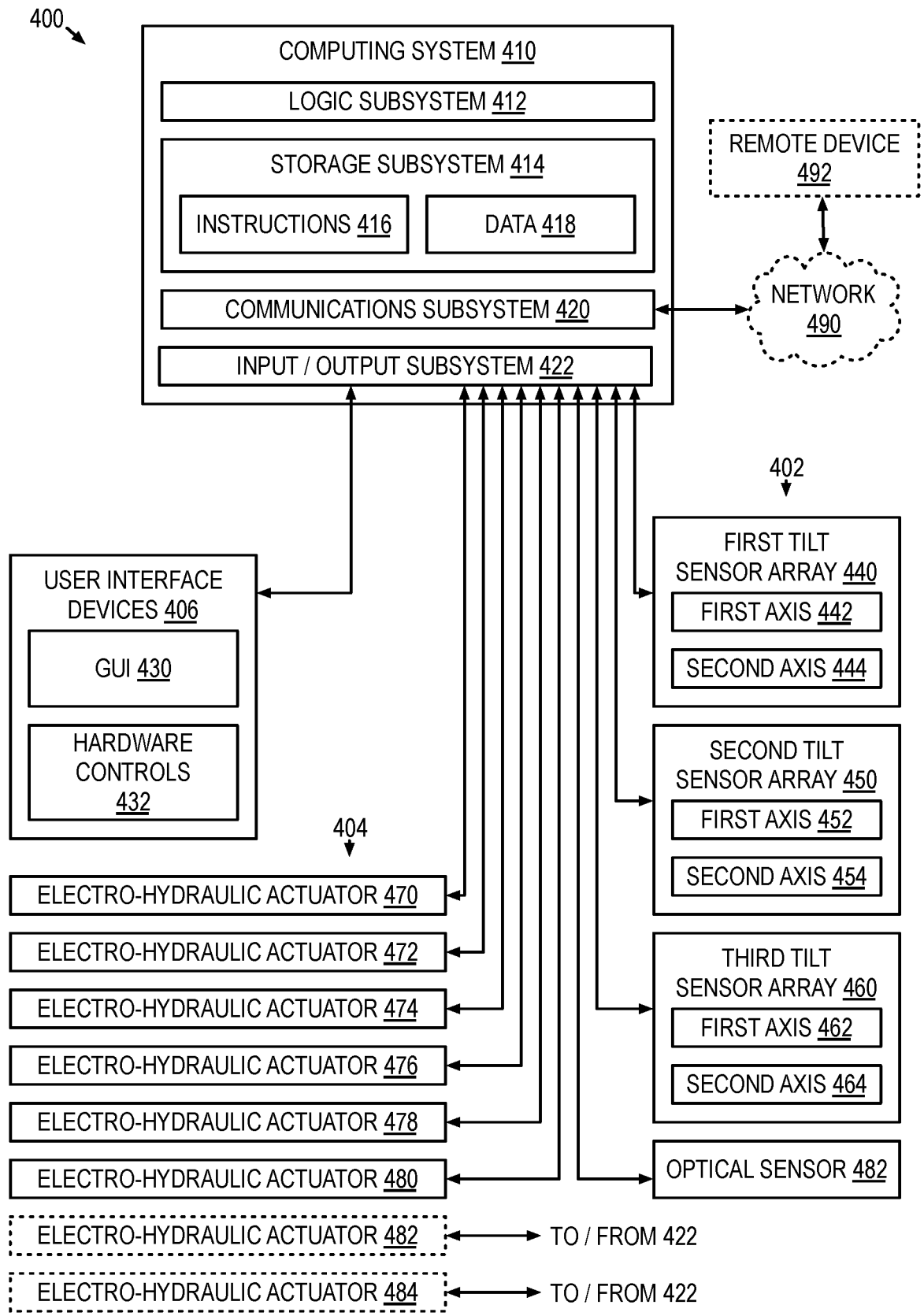
FIG. 4 is a schematic diagram depicting an example electronic system of a trailer tipper.

FIG. 4 is a schematic diagram depicting an example electronic system 400 of a trailer tipper. Electronic system 400 includes a computing system 410, a set of one or more sensors 402, a set of one or more electrically controlled actuators 404, and a set of one or more user interface devices 406. These components of electronic system 400 may be mounted on-board and may be integrated with the trailer tipper in at least some implementations. In this configuration, the trailer tipper may take the form of a mobile or stationary trailer tipper that is accompanied by these various components of electronic system 400. For example, electronic system 400 may be mounted on-board and integrated with trailer tipper 100 of FIGS. 1-3.

Computing system 410 may include one or more computing devices that may be programmed to perform one or more of the methods or operations disclosed herein. Computing system 410 includes a logic subsystem 412, a storage subsystem 414, an input/output subsystem 422, and may optionally include a communications subsystem 420. Storage subsystem may have instructions 416 stored thereon that are executable by logic subsystem 412 to perform one or more methods or operations, including an automated leveling operation and/or an automated tipping operation, as non-limiting examples. Storage subsystem may further have data 418 stored thereon, which may include any of the data described herein, including pre-defined data and/or measurement data obtained from the set of sensors 402.

Computing system 410 may communicate with the set of sensors 402, the set of actuators 404, and the set of user interface devices 406 via input/output subsystem 422 over wired and/or wireless communication links. Computing system 410 may optionally communicate over wired and/or wireless communication links with one or more remote computing devices (e.g., 492) via a communications network 490. Communications network 490 may include one or more wide area networks (e.g., the Internet or a portion thereof), local area networks (e.g., wireless edge networks), and/or personal area networks.

The set of sensors 402 may include one or more tilt sensor arrays 440, 450, 460, etc. A tilt sensor array may include an individual tilt sensor or multiple tilt sensors. A tilt sensor array may collectively provide measurements of orientation relative to one, two, three, or more axes or other dimensions. For example, first tilt sensor array 440 provides measurements of orientation about a first axis 442 and a second axis 444 that is orthogonal to first axis 442 to thereby provide measurements of orientation of a plane containing first axis 442 and second axis 444. However, first tilt sensor array 440 may take other suitable configurations. A tilt sensor may include an inclinometer, a tilt switch, an accelerometer, a gyroscope, or other suitable sensor that provides measurements of an angle of inclination relative to a datum, such as a gravity vector or a pre-defined reference (e.g., a horizontal line or horizontal plane). Non-limiting examples of commercially available tilt sensors include: CAN BUS-type STW TECHNIC™ brand, model 1000000802; SIKO™ brand, models IK360 or IK360L; or hardwired-type TURCK™ brand, model B1N360V. However, other suitable sensors may be used.

Second tilt sensor array 450 may similarly provide measurements of orientation of a plane containing first axis 452 and second axis 454 that is orthogonal to first axis 452. However, second tilt sensor array 450 may take other suitable configurations, and may differ from first tilt sensor array 440 in at least some implementations. Third tilt sensor array 460 similarly provides measurements of orientation of a plane containing first axis 462 and second axis 464 that is orthogonal to first axis 462. However, third tilt sensor array 460 may take other suitable configurations, and may differ from first and/or second tilt sensor arrays 440, 450 in at least some implementations. In each of the above examples, tilt sensor arrays 440, 450, and 460 may provide a measurement of orientation about one axis or two axes of rotation within one-degree or two-degrees of freedom (e.g., pitch and roll), respectively. With each of tilt sensor arrays 440, 450, and 460, measurements of orientation may be further supported in a third axis that is orthogonal to the first and second axes, thereby providing a measurement of orientation in three degrees of freedom (e.g., pitch, yaw, and roll).

As previously described with reference to trailer tipper 100 of FIGS. 1-3, tilt sensors or tilt sensor arrays may be mounted on a trailer tipper at various locations. As a non-limiting example, first tilt sensor array 440 may be mounted on a tipper platform, such as previously described with reference to location 220 of FIGS. 2 and 3; second tilt sensor array 450 may be mounted on a frame, such as previously described with reference to location 222 of FIGS. 2 and 3; and third tilt sensor array 460 may be mounted on the frame at a different location from second tilt sensor array 450, such as previously described with reference to location 224 of FIGS. 2 and 3. However, other suitable locations may be provided, as previously described.

The set of sensors 402 may further include one or more optical sensors (e.g., optical sensor 482) located on-board the trailer tipper. Optical sensor 482 may include one or more infrared and/or visible light cameras. As an example, optical sensor 482 may record video and/or static images of a tipping platform region of the trailer tipper or other suitable portion or surrounding region of the trailer tipper. For example, optical sensor 482 may be used to visually monitor a tipping platform region or other region for fires or smoldering events that may arise in the contents of the trailers being loaded onto the tripping platform and/or tipped.

Sensor signals generated or otherwise originating from each sensor of the set of sensors 402 may be received by computing system 410 via input/output subsystem 422. These sensor signals may be converted and/or interpreted by the computing system or other suitable intermediate device as data measurements that may be processed, stored, presented to users/operators, and/or reported to remote computing devices (e.g., 492) over a communications network. The set of sensors 402 may include other suitable sensors, depending on implementation. For example, the set of sensors 402 may include a presence sensor that detects whether the tipping platform is located at a particular orientation (e.g., hinge axis angle) relative to the frame, such as whether the tipping platform is presently located at the initial position 132A of FIG. 2, or a maximum position. This presence sensor may, for example, take the form of a switch or a Hall effect sensor, among other suitable sensor types.

The set of electrically controlled actuators 404 may include a set of electro-hydraulic actuators associated with respective hydraulically variable outriggers. As previously described, a trailer tipper may include a set of outriggers that may be deployed to partially or fully support the trailer tipper relative to a ground surface. Each outrigger may include a leg that is hydraulically variable in length by an associated electro-hydraulic actuator.

In this example, the set of actuators 404 includes six electro-hydraulic actuators 470, 472, 474, 476, 478, 480 that correspond to six hydraulically variable outriggers. These six outriggers may refer to the six outriggers of trailer tipper 100 of FIG. 1, as a non-limiting example. Here, for example, actuators 470, 472, 474 may correspond to outriggers (e.g., 180, 182, 184) located on a right-hand side of the trailer tipper in which actuator 470 is located near a dumping end of the trailer tipper, actuator 472 is located near an intermediate location, and actuator 474 is located near a loading end of the trailer tipper. Actuators 476, 478, 480 may correspond to outriggers (e.g., 186, 188, 190) located on a left-hand side of the trailer tipper in which actuator 476 is located near the dumping end of the trailer tipper, actuator 478 is located near an intermediate location, and actuator 480 is located near the loading end of the trailer tipper. However, a trailer tipper may include a greater quantity or lesser quantity of hydraulically variable outriggers and associated electro-hydraulic actuators, depending on implementation. In these implementations, electro-hydraulic actuators associated with hydraulically variable outriggers may enable computing system 410 to perform an automated leveling operation with respect to the trailer tipper. In at least some implementations, data 418 stored within storage subsystem 414 may include a pre-defined association (e.g., map or lookup table) between individual actuators of the set of hydraulic actuators 404, each of the outriggers and their respective locations/configurations, and each tilt sensor of the set of tilt sensors 402 and their respective locations/configurations.

The set of electrically controlled actuators 404 may optionally include another set of electro-hydraulic actuators associated with hydraulically variable tipping arms that join a tipping platform to a frame of the trailer tipper. A length of each tipping arm may be hydraulically variable by an associated electro-hydraulic actuator. For example, electro-hydraulic actuator 482 may be associated one or more tipping arms of a trailer tipper, such as previously described tipping arms 120, 122 of FIG. 1. As another example, each hydraulically variable tipping arm may include a respective electro-hydraulic actuator, such as actuators 482, 484. In these implementations, electro-hydraulic actuators associated with hydraulically variable tipping arms may enable computing system 410 to perform tipping operations or enable tipping operations to be performed. However, in other implementations, hydraulically variable tipping arms may be manually operated by a user/operator of the trailer tipper through hydraulic actuators to adjust the length of the tipping arms while performing a tipping operation. In these implementations, electro-hydraulic actuators 482, 484 may be optionally omitted.

In at least some implementations, electro-hydraulic actuators and hydraulic actuators of a trailer tipper may include or may be associated with sensors that provide an indication of hydraulic pressure, hydraulic fluid level, and/or position of an actuated element (e.g., length of a leg of an outrigger, tipping arm length, etc.). These sensors may form part of the set of sensors 402, and may provide sensor measurements to computing system 410 via input/output subsystem 422 as previously described with reference to the set of sensors 402. For example, the set of sensors 402 may further include one or more pressure sensors (e.g., pressure transducers) that measure a hydraulic pressure of the hydraulic system for some or all of the hydraulically actuated outriggers and/or tipping arms.

User interface devices 406 may include one or more user/operator input devices and/or one or more user/operator output devices. Non-limiting examples of input devices include a button, a switch, a joystick, a computer mouse, a touch-screen display, a microphone, an optical sensor, etc., which are non-limiting examples of hardware controls 432. Such input devices may enable a user/operator to provide a control input to computing system 410. Non-limiting examples of output devices include a graphical display device (e.g., a touch-screen display or non-touch-sensitive display), a dedicated display indicator (indicator light), an audio speaker, etc. A graphical display device of user interface devices 406 may be used to present a graphical user interface 430, for example. Graphical forms of data and/or operational interfaces or menus may be presented by computing system 410 to a user/operator of the trailer tipper via GUI 430, among other suitable output devices.

While user interface devices 406 are described as forming part of the electronic system 400 of the trailer tipper, in at least some implementations, a wireless handheld computing device or remote computing device (e.g., remote device 492) may replace some or all of the on-board user interface devices 406, including any of previously described input/output devices of user interface devices 406, hardware controls 432, and/or GUI 430. Furthermore, some or all of the logic subsystem and/or storage subsystem (or instructions/data thereof) may reside at a remote location (e.g., remote device 492).

FIG. 5 is a flow diagram depicting an example method 500 for controlling operation of a trailer tipper. Method 500 or portions thereof may take the form of a computerized method that is performed by a computing system located on-board the trailer tipper or interfacing with the trailer tipper. The computing system may take the form of computing system 410 of FIG. 4, for example. The trailer tipper may take the form of trailer tipper 100 of FIGS. 1-3, for example. Accordingly, the trailer tipper may include one or more tilt sensors located at one or more locations on-board the trailer tipper.

In at least some implementations, the tilt sensors disclosed herein may be installed on the trailer tipper in a non-adjustable configuration. The tilt sensor(s) report to the control system of the trailer tipper the raw slope/tilt/yaw data. The control system has "offsets" to adjust raw data to real world angles (e.g., level). Non-limiting examples of specific implementations include: (1) level the trailer tipper, then push a "ZERO" button on a human machine interface (HMI) (i.e., a user interface) to capture this position and automatically compute offset values; (2) direct adjustment of the offset values (e.g., place a digital level on the machine and record the actual slope or tilt, adjust the offset values so that the raw values plus the offset values match the digital level readings). In an example, adjustment of the offset values may be performed at the factory, before shipment, on HMI screens or user interfaces of the control system accessible only to those having an appropriate password, thereby limiting or precluding downstream consumers from adjusting these offset values.

At 510, the method includes obtaining a first set of sensor signals from a first tilt sensor array mounted at a first location on a tipping platform of the trailer tipper. As previously described, the tipping platform may be rotatable relative to a frame of the trailer tipper about a hinge axis. The first tilt sensor array may refer to tilt sensor array 440 of FIG. 4, and the first location may refer to location 220 of FIG. 2, for example.

At 512, the method includes determining a first difference between an initial orientation of the tipping platform at the first location indicated by the first set of sensor signals about one or more rotational axes (e.g., one rotational axis, or two or three orthogonal rotational axes) relative to a first reference datum (e.g., a reference line or a reference plane having a predefined orientation) at an initial rotational position of the tipping platform (e.g., fully declined). In at least some implementations, the hinge axis defining an axis of rotation of the tipping platform relative to the frame of the trailer tipper has a vector component within at least one of the rotational axes for which orientation of the tipping platform is measured by the first sensor array. In the context of the first set of sensor signals indicating an orientation about two orthogonal rotational axes, determining the first difference at 512 may include determining the first difference between the initial orientation of the tipping platform at the first location indicated by the first set of sensor signals about two orthogonal rotational axes relative to a first reference plane containing the first reference datum at the initial rotational position of the tipping platform.

At 514, the method includes controlling one or more electro-hydraulic actuators of the set of outriggers to vary a height of one or more outriggers (e.g., outriggers 180 and/or 196 located at the dumping end of the tipper, and/or other outriggers) of the set of outriggers to reduce the first difference between the initial orientation at the first location relative to the first reference datum to within a first threshold. In the context of the first set of sensor signals indicating an orientation about two orthogonal axes, controlling the one or more electro-hydraulic actuators to reduce the first difference to within the first threshold is between the initial orientation of the tipping platform at the first location about the two orthogonal rotational axes relative to a first reference plane that contains the first reference datum. Alternatively or additionally, this first difference may be presented to a user/operator to enable manual leveling to be performed. As previously described with reference to FIG. 4, the computing system may reference a pre-defined association between or among actuators, outriggers, and tilt sensor arrays to thereby enable the computing system to adjust particular actuators in response to particular tilt sensor measurements to achieve a pre-defined orientation of the tipper in one, two, or three degrees of freedom.

Optionally, the trailer tipper may include a second tilt sensor array mounted at a second location on the frame of the trailer tipper. The second tilt sensor array may refer to tilt sensor array 450 of FIG. 4, and the second location may refer to location 222 of FIGS. 2 and 3, for example. In these implementations, the method at 516 may include obtaining a second set of sensor signals from a second tilt sensor array mounted at a second location on the frame of the trailer tipper. At 518, the method may include determining a second difference between an initial orientation of the frame at the second location of the second tilt sensor array indicated by the second set of sensor signals about one or more rotational axes (e.g., one rotational axis, or two or three orthogonal rotational axes) relative to a second reference datum (e.g., a reference line or a reference plane having a predefined orientation). The second reference datum may be the same as or differ from the first reference datum, depending on implementation. In the context of the second set of sensor signals indicating an orientation about two orthogonal rotational axes, determining the second difference at 518 may include determining the second difference between the orientation of the frame at the second location indicated by the second set of sensor signals about two orthogonal rotational axes relative to a second reference plane containing the second reference datum. At 520, the method may include controlling one or more electro-hydraulic actuators of the set of outriggers to vary a height of one or more outriggers (e.g., intermediate outriggers 182 and/or 188, and/or other outriggers) of the set of outriggers to reduce the difference between the initial orientation of the frame at the second location relative to the second reference datum to within a second threshold. Alternatively or additionally, this second difference may be presented to a user/operator to enable manual leveling to be performed. The second threshold may be the same as or may differ from the first threshold described with reference to operation 514, depending on implementation.

Optionally, the trailer tipper may include a third tilt sensor array mounted at a third location on the frame of the trailer tipper. The third tilt sensor array may refer to tilt sensor array 460 of FIG. 4, and the third location may refer to location 224 of FIG. 2, for example. In these implementations, the method at 522 may include obtaining a third set of sensor signals from a third tilt sensor array mounted at a third location on the frame of the trailer tipper. At 524, the method may include determining a third difference between an initial orientation of the frame at the third location of the third tilt sensor array indicated by the third set of sensor signals about one or more rotational axes (e.g., one rotational axis, or two or three orthogonal rotational axes) relative to a third reference datum (e.g., a reference line or a reference plane having a predefined orientation). The third reference datum may be the same as or differ from the first reference datum and/or the second reference datum, depending on implementation. In the context of the third set of sensor signals indicating an orientation about two orthogonal rotational axes, determining the third difference at 524 may include determining the third difference between the orientation of the frame at the third location indicated by the third set of sensor signals about two orthogonal rotational axes relative to a third reference plane containing the third reference datum. At 526, the method may include controlling one or more electro-hydraulic actuators of the set of outriggers to vary a height of one or more outriggers (e.g., outriggers 184 and/or 190 located at the loading end of the tipper, and/or other outriggers) of the set of outriggers to reduce the difference between the initial orientation of the frame at the third location relative to the third reference datum to within a third threshold. Alternatively or additionally, this third difference may be presented to a user/operator to enable manual leveling to be performed. The third threshold may be the same as or may differ from the first threshold and/or the second threshold described with reference to operations 514 and 520, depending on implementation.

At 528, the method includes while operating within the first threshold with respect to the first tilt sensor array (and/or the second threshold and/or the third threshold), enabling a tipping operation in which the tipping platform is rotated relative to the frame by one or more hydraulically variable tipping arms. As an example, the tipping operation may be enabled or performed only while operating within the first threshold, the second threshold, and the third threshold. As another example, the tipping operation may be enabled or performed only while operating within the first threshold, and at least one of the second threshold or the third threshold. As yet an example, the tipping operation may be enabled or performed only while operating within at least one of the first threshold, the second threshold, or the third threshold. Hydraulic actuators associated with the hydraulically variable tipping arms may take the form of electro-hydraulic actuators that are controlled by the computing system. Alternatively, these hydraulic actuators may be manually controlled upon the computing system enabling the manually controlled tipping operation.

Within the context of computer-controlled tipping operations, the tipping operation may be enabled by allowing a user/operator to initiate a tipping operation that is then performed by the computing system. For example, a tipping operation may be electrically or electro-hydraulically enabled or disabled from being performed by a control system of the tipper, such as computing system 410 of FIG. 4. During a tipping operation, the computing system may vary the angle of the tipping platform relative to the frame about the hinge axis responsive to user input. In at least some implementations, the angle of tipping platform may be varied according to a defined rate of rotation from an initial angle (e.g., angle 234 of FIG. 2) to a final tipping angle (e.g., angle 236 of FIG. 2) or a maximum tipping angle by controlling electro-hydraulic actuators associated with the tipping arms. Within the context of manual tipping operations, the computing system may preclude or enable operation of hydraulic actuators associated with the tipping arms through an electrical rely or other suitable approach.

It will be appreciated that the leveling techniques described with reference to operations 510-526 may be performed in a variety of ways to level a tipper. As a first example, leveling of the frame may be performed at an intermediate location by performing operations 516, 518, and 520 prior to performing leveling at the dumping end (e.g., operations 510, 512, and 514) and/or the loading end (e.g., operations 522, 524, and 526). As a second example, operations 510-524 may be performed in the order depicted in FIG. 5 to provide leveling based on sensor measurements obtained from the tipping platform and/or from the dumping end before leveling other portions of the frame. As a third example, leveling of the frame may be performed at a loading end location by performing operations 522, 524, and 526 prior to performing leveling at the intermediate location (e.g., operations 516, 518, and 520) and/or the loading end (e.g., operations 522, 524, and 526). As a fourth example, leveling may be performed concurrently and/or in parallel at two or three locations, including the dumping end, the intermediate location, and/or the loading end. Furthermore, it will be understood that some of the operations described in FIG. 5 may be omitted or repeated, depending on implementation.

In least some implementations, the leveling techniques described with reference to operations 510-526 may be preceded by or performed concurrently with an additional set of operations in which one or more electro-hydraulic actuators are controlled to vary a height of one or more outriggers of the set of outriggers responsive to a hydraulic pressure of a hydraulic system of the one or more outriggers to attain a target pressure range for the hydraulic pressure. For example, some or all of the outriggers may be extended until a target hydraulic pressure is achieved for each outrigger, indicating an initial contact with the ground surface. This pressure-based technique may be performed on intermediate outriggers (or other outriggers) prior to leveling with the first tilt sensor array, as an example.

At 530, the method includes, during the tipping operation, obtaining a subsequent set of sensor signals from the first tilt sensor array. The subsequent set of sensor signals obtained from the first tilt sensor array may provide an indication of a subsequent rotational position or orientation relative to the first reference datum and/or the initial rotational position or orientation of the tipping platform, such as previously described with reference to operations 510 and 512. At 532, the method includes limiting a maximum tipping angle of the tipping platform about the hinge axis relative to the frame during the tipping operation based on a subsequent orientation indicated by the subsequent set of sensor signals from the first tilt sensor array. Within the context of computer automated tipping operations, the computing system, as previously described, may vary the angle of the tipping platform relative to the frame about the hinge axis according to a defined rate of rotation from an initial angle (e.g., angle 234 of FIG. 2) to a final tipping angle (e.g., angle 236 of FIG. 2) or a maximum tipping angle by controlling electro-hydraulic actuators associated with the tipping arms based on feedback received from the first tilt sensor array. Within the context of manual tipping operations, the computing system may limit the rotation angle of the tipping platform about the hinge axis to a maximum tipping angle as detected by the first tilt sensor array (e.g., at location 220) to preclude the user/operator from rotating the tipping platform beyond the maximum tipping angle. Again, the computing system may preclude operation of hydraulic actuators associated with the tipping arms beyond the maximum tipping angle through an electrical rely or other suitable approach. In at least some implementations, a tipping platform may include one or more additional tilt sensor arrays located at a distal end of the tipping platform from the hinge or at an intermediate location along the tipping platform. These additional tilt sensor arrays may be used in addition to or as an alternative to the first tilt sensor array (e.g., at location 220) to measure and control the tipping angle.

Operations 510-526 may correspond to an automated or partially automated leveling operation. In at least some implementations one or more of operations 510-526 may be initiated in response to a user/operator control input provided via a user input device or a GUI thereof, and/or may be accompanied by presentation of measurement data or other information via an output device or a GUI thereof. Operations 528-532 may correspond to an automated or partially automated tipping operation. In at least some implementations one or more of operations 528-532 may be initiated in response to a user/operator control input provided via a user input device or a GUI thereof, and/or may be accompanied by presentation of measurement data or other information via an output device or a GUI thereof.

At 534, the method may include processing, storing, presenting, and/or reporting measurement data and/or processed forms thereof. For example, measurement data received from the various sensors may be processed by the computing system located on-board the trailer tipper to obtain a processed form of the measurement data. The measurement data and/or processed forms thereof may be stored in local data storage of the computing system on-board the trailer tipper. The stored data may be associated with a time stamp indicating a time at which the measurement data was received from the sensors. The measurement data and/or processed forms thereof may be presented to users/operators via an output device on-board the trailer tipper, such as a graphical display, for example. As a non-limiting example, detection of a fire or smoldering event via an optical sensor of the electronic system may cause the computing system to output an indication of a detected fire, and may further disable operation of the tipping platform and/or automatically return the tipping platform to an initial or default position or orientation. The measurement data and/or processed forms thereof may be reported to a remote computing device over a communications network. The remote computing device may process, store, present, and/or report the measurement data and/or processed forms thereof off-board the trailer tipper. As non-limiting examples, the computing system may report performance metrics such as quantity of tipping operations within a time period off-board the tipper, fire detection may be reported off-board the tipper by the computing system, and/or other suitable performance metrics or incident information. While operation 534 is described at the conclusion of method 500, it will be understood that operation 534 may be performed concurrently with, before, and/or after any of the other operations of method 500.

In at least some implementations, the methods and operations described herein may be tied to a computing system of one or more computing devices. In particular, such methods and operations may be implemented as a computer program, an application-programming interface (API), a library, and/or other computer-program product. Referring again to FIG. 4, computing system 400 can enact one or more of the methods and operations described herein. Computing system 400 may take the form of one or more personal computers, server computers, tablet computers, network computing devices, mobile computing devices, mobile communication devices (e.g., smart phone), telematics devices, on-board electronic control system of a trailer tipper or other vehicle, and/or other types of computing devices.

Logic subsystem 412 may include one or more logic machines, and storage subsystem 414 may include one or more data storage machines. A logic machine includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

A logic machine may include one or more processors configured to execute software instructions. Additionally or alternatively, a logic machine may include one or more hardware or firmware logic machines configured to execute hardware or firmware instructions. Processors of a logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of a logic machine may be virtualized and executed by remotely accessible, networked computing devices configured in a cloud-computing configuration.

A storage machine includes one or more physical devices configured to hold instructions executable by a logic machine to implement the methods and operations described herein. When such methods and operations are implemented, the state of the storage machine may be transformed, e.g., to hold different data. A storage machine may include removable and/or built-in devices. A storage machine may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. A storage machine may include volatile, nonvolatile, dynamic, static, read/write, read-only, random-access, sequential-access, location-addressable, file-addressable, and/or content-addressable devices.

It will be appreciated that a storage machine includes one or more physical devices. However, aspects of the instructions described herein alternatively may be propagated by a communication medium (e.g., an electromagnetic signal, an optical signal, etc.) that is not held by a physical device for a finite duration.

Logic subsystem 412 and storage subsystem 414 may be collectively referred to as a computing platform. Aspects of logic subsystem 412 and storage subsystem 414 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" or "module" may be used to describe an aspect of computing system 400 implemented to perform a particular function. In some cases, a program or module may be instantiated via logic subsystem 412 executing instructions 416 held by storage subsystem 414. It will be understood that different modules, programs, and/or engines may be instantiated from the same application, service, code block, object, library, routine, API, function, etc. Likewise, the same program or module may be instantiated by different applications, services, code blocks, objects, routines, APIs, functions, etc. The terms "program" or "module" may encompass individual or groups of executable files, data files, libraries, drivers, scripts, database records, etc.

When included, a graphical display of user interface devices 406 may be used to present a visual representation of instructions 416 and/or other data 418 held by storage subsystem 412. This visual representation may take the form of a graphical user interface, such as GUI 430. As the herein described methods and operations change the data held by the storage subsystem, and thus transform the state of the storage subsystem, the state of the graphical display may likewise be transformed to visually represent changes in the underlying data. In at least some implementations, a graphical display device may be combined with logic subsystem 412 and/or storage subsystem 414 in a shared enclosure, or a graphical display device may take the form of a peripheral display device. Likewise, other input/output devices of user interface devices 406 may be share an enclosure with logic subsystem 412 and storage subsystem 414, or may take the form of peripheral devices.

It will be understood that the configurations and/or approaches described herein are exemplary in nature, and that these specific implementations or examples are not to be considered in a limiting sense, because numerous variations are possible. The specific methods or operations described herein may represent one or more of any number of processing strategies. As such, various acts illustrated and/or described may be performed in the sequence illustrated and/or described, in other sequences, in parallel, or omitted. Likewise, the order of the above-described methods or operations may be changed. The subject matter of the present disclosure includes all novel and non-obvious combinations and sub-combinations of the various methods, operations, systems, components, and configurations, and other features, functions, acts, and/or properties disclosed herein, as well as any and all equivalents thereof.

The invention claimed is:

1. A trailer tipper, comprising:
a frame at least partially supportable relative to a ground surface by a set of hydraulically variable outriggers;
a tipping platform rotatably mounted to the frame and rotatable relative to the frame about a hinge axis;
one or more hydraulically variable tipping arms further joining the frame to the tipping platform;
a first tilt sensor array mounted at a first location on the tipping platform;
a computing system programmed to:
obtain a first set of sensor signals from the first tilt sensor array;
determine a first difference between an initial orientation of the tipping platform at the first location indicated by the first set of sensor signals about two orthogonal rotational axes relative to a first reference plane at an initial rotational position of the tipping platform, the hinge axis having a vector component within at least one of the two orthogonal rotational axes;
control one or more electro-hydraulic actuators of the set of hydraulically variable outriggers to vary a height of one or more outriggers of the outriggers to reduce the first difference between the initial orientation of the tipping platform at the first location relative to the first reference plane to within a first threshold;
while operating within the first threshold, enable a tipping operation in which the tipping platform is rotated relative to the frame by one or more tipping hydraulic actuators associated with the one or more hydraulically variable tipping arms;
during the tipping operation, obtain a subsequent set of sensor signals from the first tilt sensor array; and
limit a maximum tipping angle of the tipping platform about the hinge axis relative to the frame during the tipping operation based on a subsequent orientation of the tipping platform indicated by the subsequent set of sensor signals from the first tilt sensor array.

2. The trailer tipper of claim 1, wherein the computing system is further programmed to:
obtain a second set of sensor signals from a second tilt sensor array mounted at a second location on the frame of the trailer tipper;
determine a second difference between an orientation of the frame at the second location of the second tilt sensor array indicated by the second set of sensor signals about two orthogonal rotational axes relative to a second reference plane; and
control one or more electro-hydraulic actuators of the set of outriggers to vary a height of one or more of the set of outriggers to reduce the second difference between the orientation of the frame at the second location relative to the second reference plane to within a second threshold;
wherein enable the tipping operation is performed only while operating within the first threshold and the second threshold.

3. The trailer tipper of claim 2, wherein the computing system is further programmed to:
obtain a third set of sensor signals from a third tilt sensor array mounted at a third location on the frame of the trailer tipper;
determine a third difference between an orientation of the frame at the third location of the third tilt sensor array indicated by the third set of sensor signals about two orthogonal rotational axes relative to a third reference plane; and
control one or more electro-hydraulic actuators of the set of outriggers to vary a height of one or more of the set of outriggers to reduce the third difference between the orientation of the frame at the third location relative to the third reference plane to within a third threshold;
wherein enable the tipping operation is performed only while operating within the first threshold, the second threshold, and the third threshold;
wherein the second location and the third location are further from the hinge axis than the first location.

4. A computerized method for controlling operation of a trailer tipper having a frame at least partially supportable relative to a ground surface by a set of outriggers, the method comprising:
- obtaining a first set of sensor signals from a first tilt sensor array mounted at a first location on a tipping platform of the trailer tipper, the tipping platform rotatable relative to the frame about a hinge axis;
- determining a first difference between an initial orientation of the tipping platform at the first location indicated by the first set of sensor signals about one or more rotational axes relative to a first reference datum;
- controlling one or more electro-hydraulic actuators of the set of outriggers to vary a height of one or more outriggers of the set of outriggers to reduce the first difference between the initial orientation at the first location relative to the first reference datum to within a first threshold;
- while operating within the first threshold, enabling a tipping operation in which the tipping platform is rotated relative to the frame by one or more hydraulically variable tipping arms;
- during the tipping operation, obtaining a subsequent set of sensor signals from the first tilt sensor array; and
- limiting a maximum tipping angle of the tipping platform about the hinge axis relative to the frame during the tipping operation based on a subsequent orientation indicated by the subsequent set of sensor signals from the first tilt sensor array.

5. The method of claim 4, wherein determining the first difference includes:
- determining the first difference between the initial orientation of the tipping platform at the first location indicated by the first set of sensor signals about two orthogonal rotational axes relative to a first reference plane containing the first reference datum at the initial rotational position of the tipping platform, the hinge axis having a vector component within at least one of the two orthogonal rotational axes.

6. The method of claim 5, wherein controlling the one or more electro-hydraulic actuators to reduce the first difference to within the first threshold is between the initial orientation of the tipping platform at the first location about the two orthogonal rotational axes relative to the first reference plane.

7. The method of claim 4, further comprising:
- obtaining a second set of sensor signals from a second tilt sensor array mounted at a second location on the frame of the trailer tipper;
- determining a second difference between an orientation of the frame at the second location of the second tilt sensor array indicated by the second set of sensor signals about one or more rotational axes relative to a second reference datum; and
- controlling one or more electro-hydraulic actuators of the set of outriggers to vary a height of one or more outriggers of the set of outriggers to reduce the second difference between the orientation of the frame at the second location relative to the second reference datum to within a second threshold.

8. The method of claim 7, wherein determining the second difference includes: determining the second difference between the orientation of the frame at the second location indicated by the second set of sensor signals about two orthogonal rotational axes relative to a second reference plane containing the second reference datum; and
- wherein controlling the one or more electro-hydraulic actuators to reduce the second difference to within the second threshold is between the frame at the second location about the two orthogonal rotational axes relative to the second reference plane.

9. The method of claim 7, wherein enabling the tipping operation is performed only while operating within the first threshold and the second threshold.

10. The method of claim 7, further comprising:
- obtaining a third set of sensor signals from a third tilt sensor array mounted at a third location on the frame of the trailer tipper;
- determining a third difference between an orientation of the frame at the third location of the third tilt sensor array indicated by the third set of sensor signals about one or more rotational axes relative to a third reference datum; and
- controlling one or more electro-hydraulic actuators of the set of outriggers to vary a height of one or more outriggers of the set of outriggers to reduce the third difference between the orientation of the frame at the third location relative to the third reference datum to within a third threshold.

11. The method of claim 10, wherein determining the third difference includes: determining the third difference between the orientation of the frame at the third location indicated by the third set of sensor signals about two orthogonal rotational axes relative to a third reference plane containing the third reference datum; and
- wherein controlling the one or more electro-hydraulic actuators to reduce the third difference to within the third threshold is between the frame at the third location about the two orthogonal rotational axes relative to the third reference plane.

12. The method of claim 10, wherein enabling the tipping operation is performed only while operating within the first threshold, the second threshold, and the third threshold.

13. The method of claim 10, wherein the third location is further from the hinge axis than the second location.

14. The method of claim 10, wherein the first location is nearer to the hinge axis than the second and third locations.

15. The method of claim 10, wherein the one or more electro-hydraulic actuators controlled to reduce the third difference to within the third threshold are associated with one or more outriggers of the set of outriggers located at an intermediate location or a loading end location along the frame;
- wherein the one or more electro-hydraulic actuators controlled to reduce the second difference to within the second threshold are associated with one or more outriggers of the set of outriggers located at the other of the intermediate location or the loading end location along the frame; and
- wherein the one or more electro-hydraulic actuators controlled to reduce the first difference to within the first threshold are associated with one or more outriggers of the set of outriggers located at a dumping end location along the frame closer to the hinge axis than the intermediate or the loading end location.

16. The method of claim 7, wherein the first location is nearer to the hinge axis than the second location.

17. The method of claim 7, wherein the one or more electro-hydraulic actuators controlled to reduce the second difference to within the second threshold are associated with one or more outriggers of the set of outriggers located at an intermediate location or a loading end location along the frame; and wherein the one or more electro-hydraulic actuators controlled to reduce the first difference to within the first threshold are associated with one or more outriggers of the set of outriggers located at a dumping end location along the frame closer to the hinge axis than the intermediate or the loading end location.

18. The method of claim 4, further comprising:
controlling the one or more electro-hydraulic actuators of the set of outriggers to vary the height of one or more outriggers of the set of outriggers responsive to a hydraulic pressure of a hydraulic system of the one or more outriggers to attain a target pressure range for the hydraulic pressure prior to controlling the one or more electro-hydraulic actuators of the set of outriggers to reduce the first difference to within the first threshold.

19. The method of claim 18, wherein the one or more electro-hydraulic actuators controlled responsive to the hydraulic pressure are associated with one or more outriggers of the set of outriggers located at an intermediate location or a loading end location along the frame; and
wherein the one or more electro-hydraulic actuators controlled to reduce the first difference to within the first threshold are associated with one or more outriggers of the set of outriggers located at a dumping end location along the frame closer to the hinge axis than the intermediate or the loading end location.

20. An article, comprising:
a computer-readable data storage device having instructions stored thereon, executable by a computing system to, with respect to a trailer tipper including:
a frame at least partially supportable relative to a ground surface by a set of hydraulically variable outriggers,
a tipping platform rotatably mounted to the frame and rotatable relative to the frame about a hinge axis, one or more hydraulically variable tipping arms further joining the frame to the tipping platform, and
a first tilt sensor array mounted at a first location on the tipping platform:
obtain a first set of sensor signals from the first tilt sensor array;
determine a first difference between an initial orientation of the tipping platform at the first location indicated by the first set of sensor signals about two orthogonal rotational axes relative to a first reference plane at an initial rotational position of the tipping platform, the hinge axis having a vector component within at least one of the two orthogonal rotational axes;
control one or more electro-hydraulic actuators of the set of hydraulically variable outriggers to vary a height of one or more outriggers of the outriggers to reduce the first difference between the initial orientation of the tipping platform at the first location relative to the first reference plane to within a first threshold;
while operating within the first threshold, enable a tipping operation in which the tipping platform is rotated relative to the frame by one or more tipping hydraulic actuators associated with the one or more hydraulically variable tipping arms;
during the tipping operation, obtain a subsequent set of sensor signals from the first tilt sensor array; and
limit a maximum tipping angle of the tipping platform about the hinge axis relative to the frame during the tipping operation based on a subsequent orientation of the tipping platform indicated by the subsequent set of sensor signals from the first tilt sensor array.

\* \* \* \* \*